(No Model.)

J. H. LANE.
LOCK FOR PIPE CONNECTIONS.

No. 509,742. Patented Nov. 28, 1893.

Witnesses:

Inventor.
James H. Lane.
By L. B. Coupland & Co
Att'ys

THE NATIONAL LITHOGRAPHING COMPANY,
WASHINGTON, D. C.

UNITED STATES PATENT OFFICE.

JAMES H. LANE, OF CHICAGO, ILLINOIS, ASSIGNOR OF ONE-HALF TO HENRY B. CHICHESTER, OF SAME PLACE.

LOCK FOR PIPE CONNECTIONS.

SPECIFICATION forming part of Letters Patent No. 509,742, dated November 28, 1893.

Application filed February 1, 1893. Serial No. 460,557. (No model.)

*To all whom it may concern:*

Be it known that I, JAMES H. LANE, a citizen of the United States, residing at Chicago, in the county of Cook and State of Illinois, have invented certain new and useful Improvements in Locks for Pipe Connections, of which the following is a full, clear, and exact description, that will enable others to make and use the same, reference being had to the accompanying drawings, forming a part of this specification.

The object of this invention is to provide a locking-device for pipe connections of couplings, whereby the connecting screw-cap is prevented from working loose, and is more especially intended for use in setting gas-meters, as will be hereinafter set forth.

Figure 1:
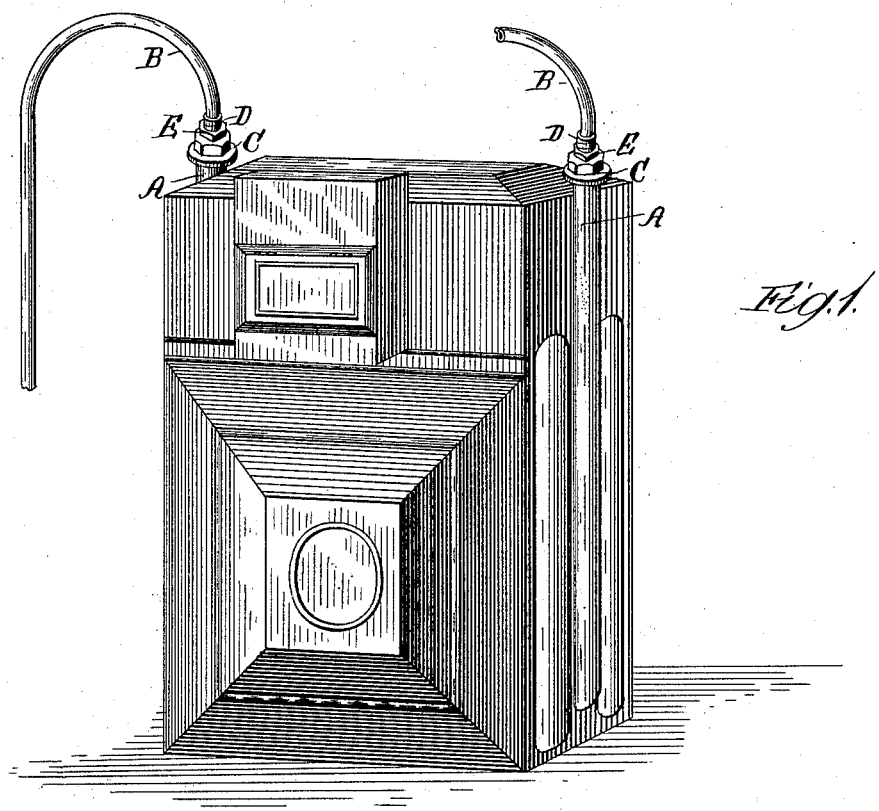
Figure 2:
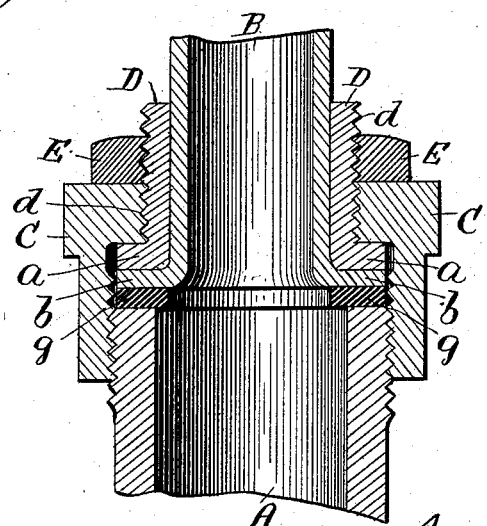

Figure 1 is a view in perspective of an ordinary gas-meter, showing pipe connections therewith embodying my improvements; and Fig. 2, a broken-away longitudinal section of a connected joint, showing the locking-device in place.

A may represent a threaded tube or iron pipe, projecting from and forming a part of a gas-meter; B the usual lead pipe connecting therewith; and C a screw-threaded coupling cap, joining the meeting ends of the tubes or pipes.

A coupling-sleeve or ferrule D, provided with a flange $a$ is slipped over the end of the lead-pipe B, which then has the flange $b$ corresponding to the flange $a$, formed thereon. The usual smooth exterior surface of the sleeve D is threaded, as at $d$, for the engagement of a threaded lock-nut E placed in position after the coupling-cap has been set up in connecting the joining ends of the pipe.

As shown in Fig. 2 of the drawings, the flange $a$ of the sleeve or ferrule $d$ extends in a direction perpendicular to the axis of said ferrule, and the flange on the lead pipe inclosed by said ferrule also extends in a direction perpendicular to the axis of the lead pipe. The turned-in and screw threaded flange of the screw threaded coupling cap has its inner and outer faces perpendicular to its axis, and the lock nut has a plane inner face perpendicular to its axis. This face bears against the end of the coupling sleeve. The effect of the lock nut, therefore, is to secure the abutting surfaces of the inturned and outturned flanges in parallelism. In making the connection, the two ends of the pipe are brought together in the usual manner with the interposed packing-washer $g$. The coupling-cap C, having a threaded engagement with the iron pipe A and bearing on the flange of the sleeve D, is then screwed up and firmly joins the meeting-ends of the pipe. Finally the locking-nut E is set up until it bears on the cap C, and all the parts firmly secured together.

In many instances the ordinary coupling-cap has worked loose and the gas thus allowed to escape. The cause of the cap working loose has usually been that of the jar incident to elevators and other machinery.

By the arrangement shown, the parts are firmly secured together and the cap locked in place so that it is impossible for the same to become loosened and thus cause a leak in a joint so made.

I do not broadly claim a lock nut in combination with a pipe coupling, as such is old. What I desire to cover is this particular coupling, which has been found valuable under severe tests.

Having thus described my invention, what I claim as new, and desire to secure by Letters Patent, is—

The outer coupling sleeve having internal screw thread and an inturned screw threaded flange at one end having faces perpendicular to the axis of said sleeve, the screw threaded ferrule having a flange inside said sleeve with faces perpendicular to the axis of the ferrule, the lock nut engaging the screw thread on the ferrule and having a plane face engaging the end of the outer sleeve, the soft metal line pipe passing through the ferrule and having a flange in contact with that of the ferrule, and the hard metal line pipe entering the sleeve in position to bear on the flange of the soft metal pipe through an intervening washer, all combined substantially as described.

JAMES H. LANE.

Witnesses:
L. M. FREEMAN,
L. B. COUPLAND.